(12) United States Patent  
Schuder et al.

(10) Patent No.: US 6,283,376 B1  
(45) Date of Patent: Sep. 4, 2001

(54) CHIP OR SMART CARD READER

(75) Inventors: Bernd Schuder, Schwaigern; Robert Bleier, Bad Wimpfen; Manfred Reichardt, Weinsberg, all of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/210,642

(22) Filed: Dec. 14, 1998

(30) Foreign Application Priority Data

Dec. 15, 1997 (DE) .............................................. 197 55 715

(51) Int. Cl.[7] ...................................................... G06K 7/00
(52) U.S. Cl. ............................ 235/486; 361/737; 439/630
(58) Field of Search ..................................... 235/486, 492, 235/483, 485; 361/737; 439/630, 638, 645, 646, 650, 657, 652, 746

(56) References Cited

U.S. PATENT DOCUMENTS

| | | | |
|---|---|---|---|
| 4,698,025 | * 10/1987 | Silbernagel et al. | 439/676 |
| 4,780,603 | 10/1988 | Hamada | 235/492 |
| 4,975,086 | * 12/1990 | Reichardt et al. | 439/629 |
| 4,990,758 | 2/1991 | Shibana et al. | 235/449 |
| 5,259,777 | * 11/1993 | Schuder et al. | 439/188 |
| 5,334,827 | * 8/1994 | Bleier et al. | 235/492 |
| 5,599,203 | * 2/1997 | Broschard, III | 439/489 |
| 5,633,490 | * 5/1997 | Vandenengel | 235/492 |
| 5,667,408 | * 9/1997 | Broschard et al. | 439/630 |

FOREIGN PATENT DOCUMENTS

| | | |
|---|---|---|
| 38 32 588 | * 5/1986 | (DE) . |
| 38 32 588 C2 | 6/1994 | (DE) .............................. H01R/9/09 |
| 0 200 449 | * 5/1986 | (EP) . |

* cited by examiner

*Primary Examiner*—Michael G. Lee  
*Assistant Examiner*—Diane I. Lee  
(74) *Attorney, Agent, or Firm*—Blank, Rome, Comisky, & McCauley, LLP

(57) ABSTRACT

A contact element support for a smart card reader having a card support surface, a plurality of chambers formed in the contact element support in the area of the card support surface, contact elements forming a snap-in to co-operate with the contact element support in an operative or inserted position, an abutment surface provided at the contact element support for co-operation with the snap-in device such that shortly before reaching the end position a snap-in tongue formed by the snap-in device snaps into a snap-in opening of the contact element support so that the contact element is fixedly held in its inserted operative position.

5 Claims, 6 Drawing Sheets

CHIP OR SMART CARD READER

TECHNICAL FIELD

The invention relates to a chip or smart card reader as it is used for contacting so-called chip or a smart-cards. A smart-card reader is in substance a contacting apparatus into which a smart card is inserted such that the contacts on the smart card, i.e. card contacts, come in contact engagement with contact elements located in said contacting apparatus. The smart card can also be "SIM" card. SIM means subscriber identity module. Thus, the term SIM card relates to a card which can be used in a mobile telephone to identify a subscriber.

BACKGROUND ART

Smart card readers have been developed in many kinds of designs. Different methods are known to fixedly mount the contact elements of a smart card reader in said smart card reader and more specifically in a contact support of said smart card reader. Frequently, the contact elements of the smart card reader are fixedly mounted in the contact support of the smart card reader by surrounding the contact elements with the plastic material when injection molding the contact support.

For instance DE-38 32 588 A1 discloses the mounting of contact elements on or in a contact support by detent means.

Smart card readers are frequently built with contact elements having soldering contacts. These soldering contacts are adapted to be inserted into holes (for instance in a circuit board) and are then dipped in a supply of solder material for providing connection. In this context problems occur both with contact elements which are fixed in the contact support by molding (see FIG. 9) and with contact elements which are inserted into the contact support (see FIG. 10) and are held therein for instance by detent means. As far as the contact elements are concerned which are fixed in the contact support by molding (see FIG. 9), a good mechanical strength of the soldering contacts is achieved. However the automatic production of larger numbers of such contact supports or contacting apparatus is costly. If the contact elements are inserted into and frictionally held in the contact support as is shown in FIG. 10, then a load pulling on said soldering contacts could cause a destruction of the contact elements.

It is an object of the present invention to provide a smart card reader, i.e. a smart card contacting apparatus as well as contact elements therefore, such that an automated insertion of the contact elements is easily possible.

It is another object of the present invention to provide a contacting apparatus and contact support of said contacting apparatus, respectively, wherein after insertion of the contact elements the mechanical characteristics are similar to those of contact elements mounted by the injection molding process of the smart card reader and its contact support, respectively.

It is another object of the present invention to increase the efficiency of the placement of the contact elements in the smart card reader.

DISCLOSURE OF THE INVENTION

The invention is directed to a smart card reader and a contact element support which preferably adapted to be used in a smart card reader. The contact support is preferably made of a plastic material. The contact support defines a card support surface and also a plurality of chambers, each chamber being adapted to receive each one contact element. The contact element has preferably the form of a contact spring and can be mounted in said contact element support in a snap-locked or detent position. Preferably, the contact elements can be inserted into said chambers in a direction parallel to the card support surface. Both the contact element and the contact element support define stop- or abutment surfaces which define and limit the path of insertion of each contact element. Said abutment surfaces are provided such that prior to reaching the end of the insertion path a snap- or detent tongue formed on the contact element snaps into a snap lock or detent opening formed by the contact element support. Thus, securing the contact element in said contact element support such that it can not become disassembled.

In accordance with another aspect of the invention a method for manufacturing a smart card reader having a contact element support is provided. Contact elements are snapped into a snap-locked position when inserting said contact elements into said contact element support in a direction in substance parallel to the card support surface.

In accordance with another aspect of the invention a contact element is provided which comprises a terminal or a contact section, a fastening section, a connection section, a seat section, a contact cusp or contact bump tip section as well as a snap tongue formed in the region of the fastening section. The fastening section further forms abutment or stop surfaces that are suitable for stopping or abutting against corresponding counter-stop or counter abutment surfaces. Preferably, the snap tongue is stamped out from the fastening section and is bent out of the plane formed by the fastening section, in particular in a direction opposite to the direction in which the connection section is bent relative to the plane formed by the fastening section.

BEST MODE FOR CARRYING OUT THE INVENTION

Figure 1:
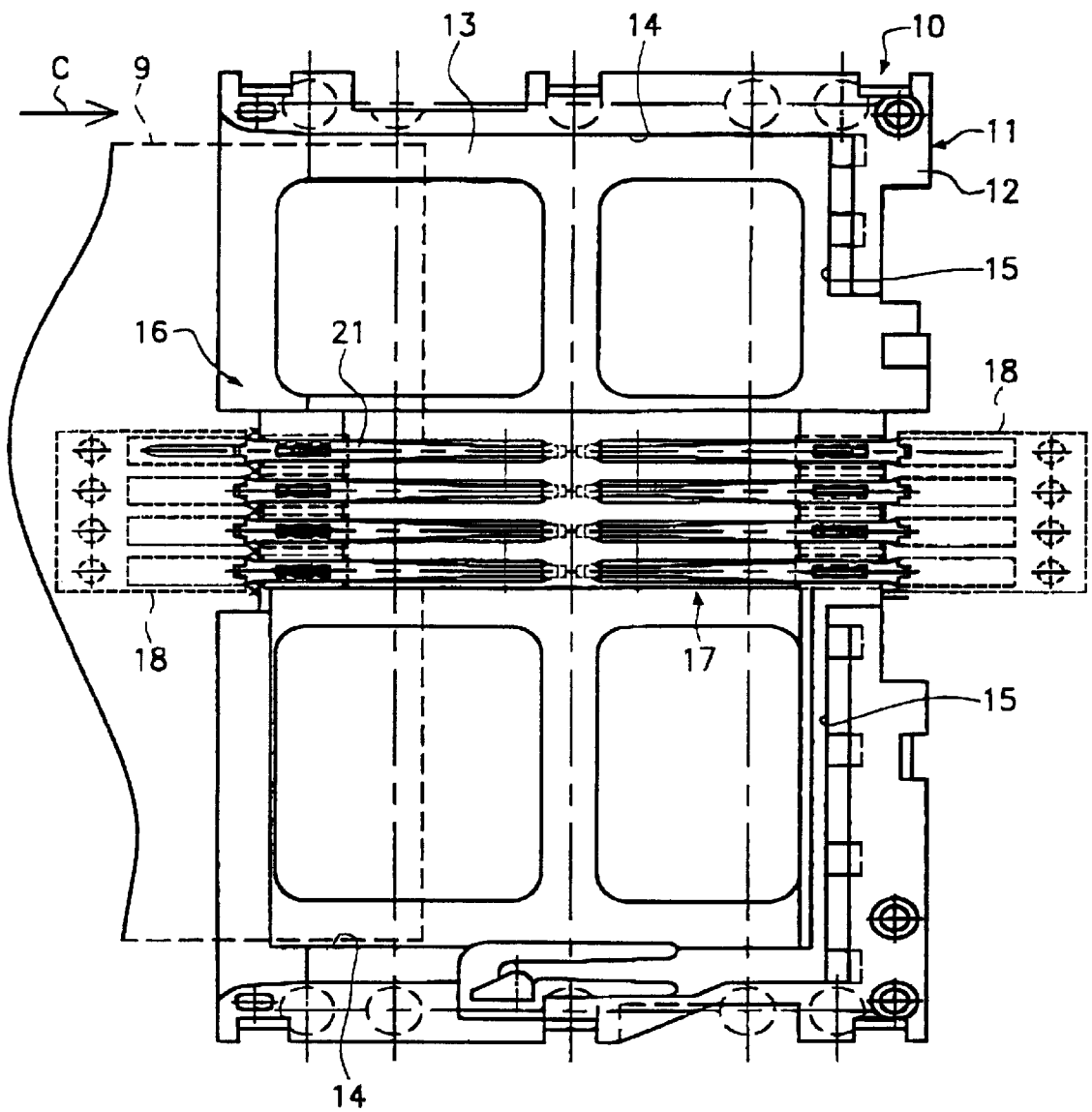
FIG. 1 is a top plan view of the top side of a smart-card reader with a cover having been removed.

Referring to the drawings and more specifically to FIG. 1 a smart card reader 10 is shown as comprising a contact support 11 which has generally the form of a frame in the embodiment shown.

The upper surface 12 of the contact support 11 forms a card support surface 13 which bordered or limited by side guide edges 14 and abutment edges 15 for a smart card 9. In FIG. 1 the smart card 9 is shown to be partially inserted with the direction of insertion being referred to by the arrow C.

Generally, a cover not shown in FIG. 1 is mounted on the contact support 11 and covers the card support surface 13. The cover forms together with the card support surface 13 a card receiving space or slot. The cover serves as a counter support for the card 9, so that the card 9 located in its fully inserted reading position is held in contact engagement, i.e. its card contacts contact the contact elements 21.

The contact elements 21 are formed in large numbers in the form of a metal strip which comprises of a plurality of contact elements. After manufacture of the contact elements 21 the individual contact elements 21 are still connected by means of a pilot strip 18. Said pilot strip 18 is preferably present when mounting a certain number of contact elements 21 and it is removed only after the contact elements 21 are properly mounted in the contact support 11.

In FIG. 1 two contact element regions 16 and 17 are disclosed. The contact elements which can preferably be in the form of contact springs 21 are of an elongate shape and form two groups of each four contact elements 21. The contact elements 21 of the group forming the contact element region 16 extend from the left (FIG. 1) lateral side of the contact support 11 inwardly. The other group of four contact elements forming the second contact element region 17 extend inwardly from the right hand lateral side of the contact support 11.

Figure 2:
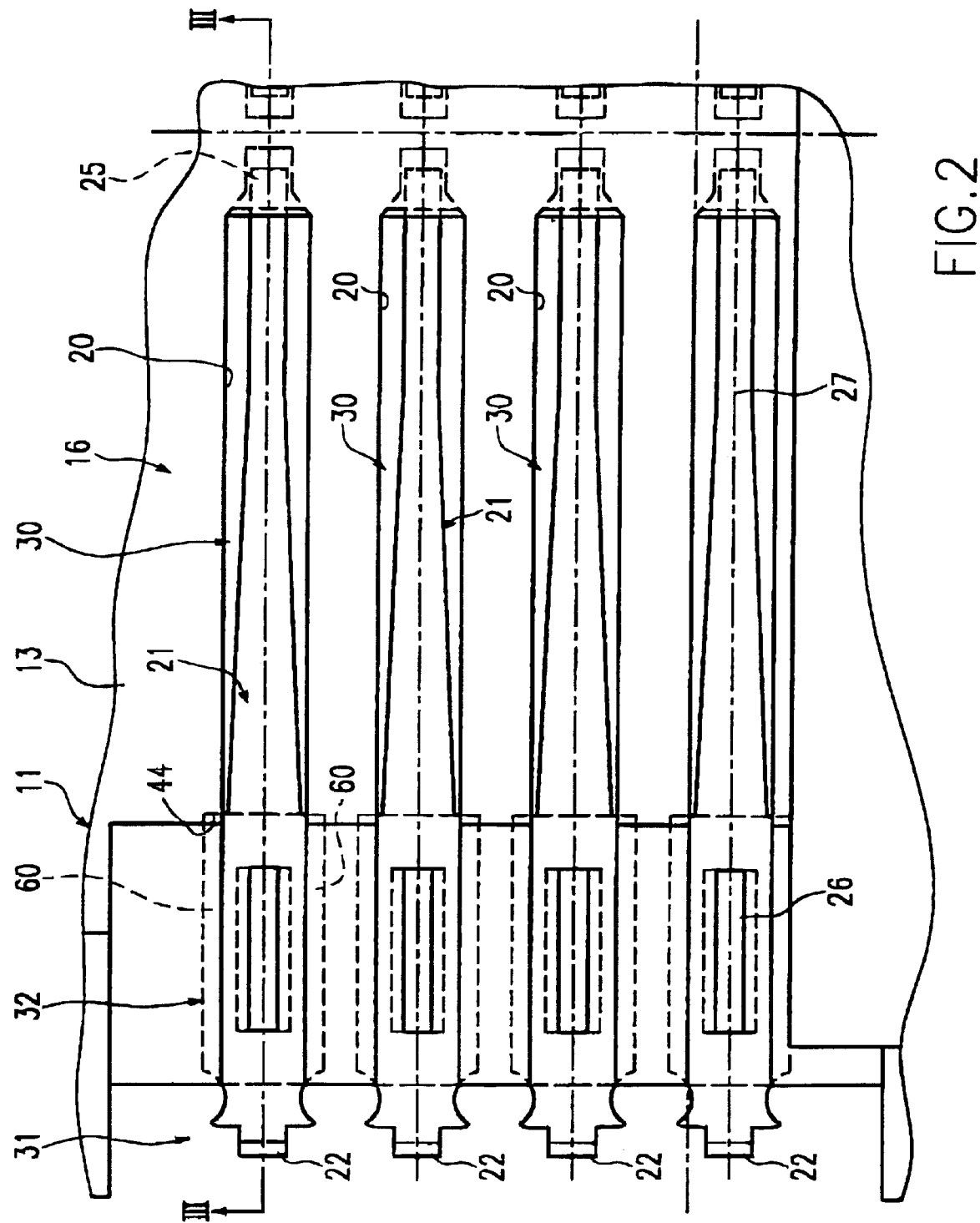
FIG. 2 is an enlarged section of the left center portion of FIG. 1.

FIG. 2 discloses an enlarged detail of FIG. 1 where the pilot strip 18 has already been removed and terminate sections 22 (see also FIG. 5) of the contact elements 21 have already been bent by 90°. In the representations of FIGS. 1 and 2 as well as FIGS. 3 and 4 the contact elements 21 are already inserted into their detent or snap-locked position and terminal or contact sections 22 project away from the bottom surface 19 (see FIG. 3) of the contact support 11. These terminal sections 22 may extend for instance into contact holes of a printed circuit board with which the smart card reader 10 is to be used. FIG. 2 shows the card support surface 13 of the contact support (also called contact frame) 11. A plurality of parallel openings or slots 20 are formed in the card support surface 13 and in the contact support 11 adapted to receive each of said contact elements 21.

Figure 3:
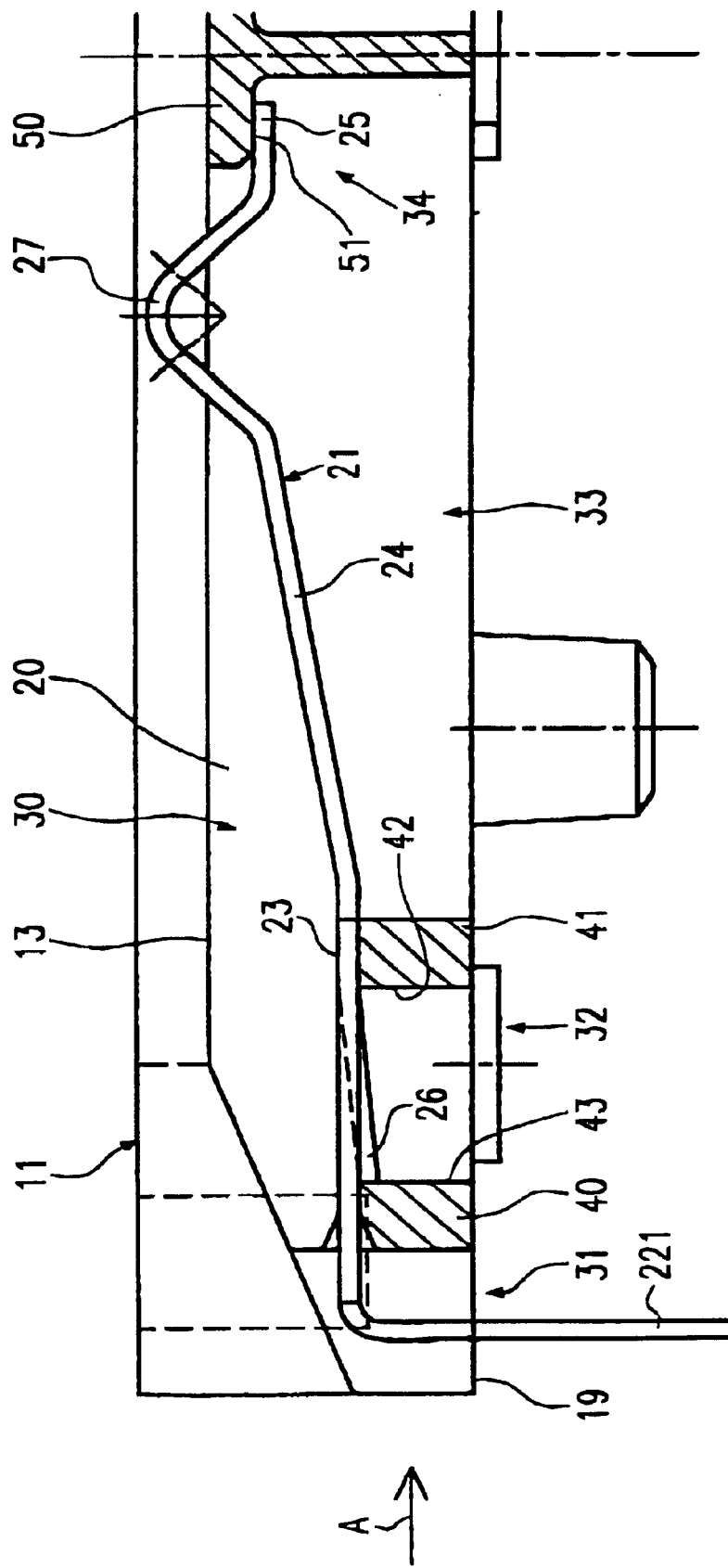
FIG. 3 is a cross-sectional view in substance along line III—III in FIG. 2.
Figure 5:
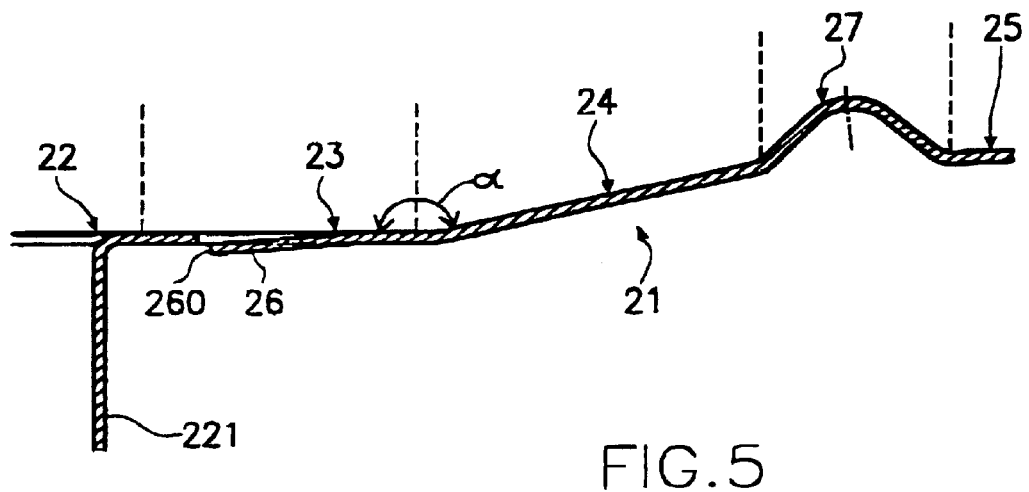
FIG. 5 is a cross-sectional view of a contact element of the invention along line V—V in FIG. 6.
Figure 6:
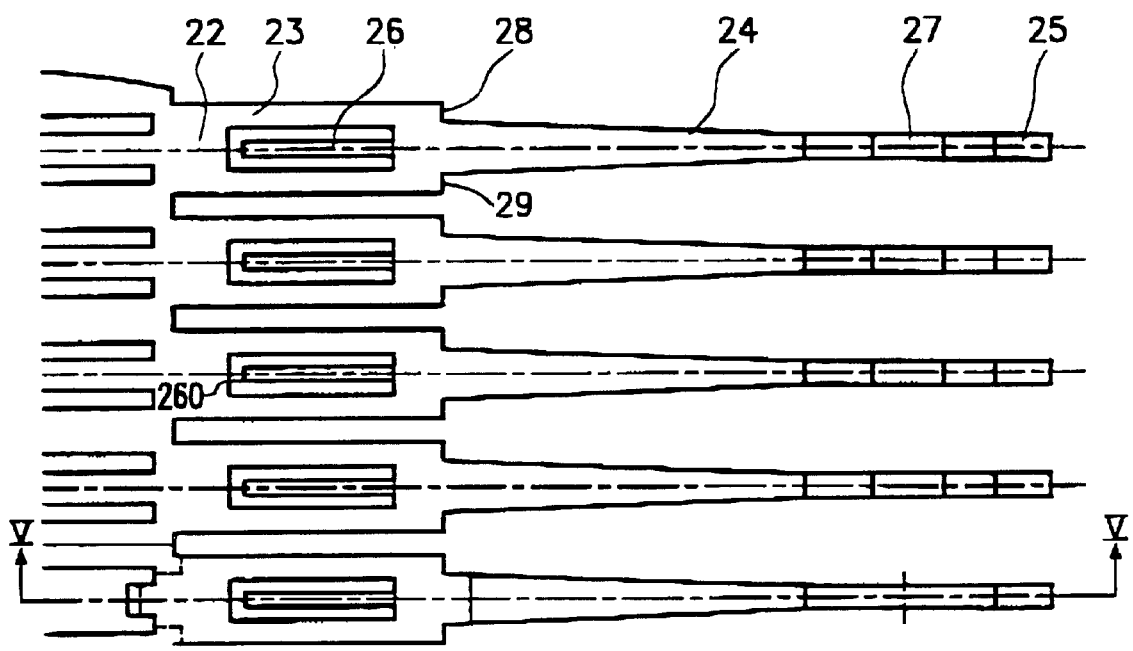
FIG. 6 is a top plan view of the contact element of FIG. 5 together with other contact elements which are connected with each other prior to being mounted and also during mounting into a smart-card reader.

FIG. 3 in particular also FIGS. 2, 5 and 6 disclose that each contact element 21 comprises besides the terminal section 22 a wide fastening section 23, a connection section 24 as well a seat section 25. Between connection section 24 and seat section 25 in a cusp section 27. A snap tongue or detent tongue 26 is formed in the area of the fastening section 23. The snap tongue 26 is preferably stamped out of the widened fastening section 23 as is shown in FIG. 6. The tongue 26 forms an abutment surface 260 (FIG. 5) at an end opposite to the direction of insertion A (see FIG. 3). The snap-in tongue 26 is bent out of the plane defined by the fastening section 23 as is shown in FIG. 5. The snap-in tongue 26 acts like a spring arm.

The connection section 24 is slightly bent upwardly with respect to the fastening section 23 (see FIG. 5) which extends substantially parallel to the card support surface 13. Thus, an angle α<180° (FIG. 5) is formed between the fastening section 23 and the connection section 24. Depending on how the angle a is chosen the contact element 21 is biased against an abutment surface 51 of a rib 50 of the contact element support 11. The contact element 21 is preferably designed as a contact spring. The biasing force with which the seat section 25 is biased against the abutment surface 51 can be larger or smaller. The termination or terminal section 22 comprises an angled termination pin 221 (FIGS. 3, 4 and 5).

As can be seen in FIG. 2 the contact element 21 has in the area of its fastening section 23 a wider shape compared with the terminal section 22 and also compared with the connection section 24. Because of the greater width of the fastening section 23 abutment surfaces 28 and 29 are formed at the transition from the fastening section 23 to the connecting section 24. These abutment surfaces 28, 29 are preferably provided opposite to each other at both sides of the transition from the fastening section 23 to the connection section 24. Moreover, the connection section 24 preferably tapers starting from said abutment surface 28, 29 towards the cusp section 27. Due to this design the contact element 21 has a homogeneous distribution of the tension occurring within the contact element 21 with the result that the force exerted by the contact element 21 on a contact, for instance a card contact of an inserted smart card 9, is guaranteed to last for a long period of operation.

Figure 4:
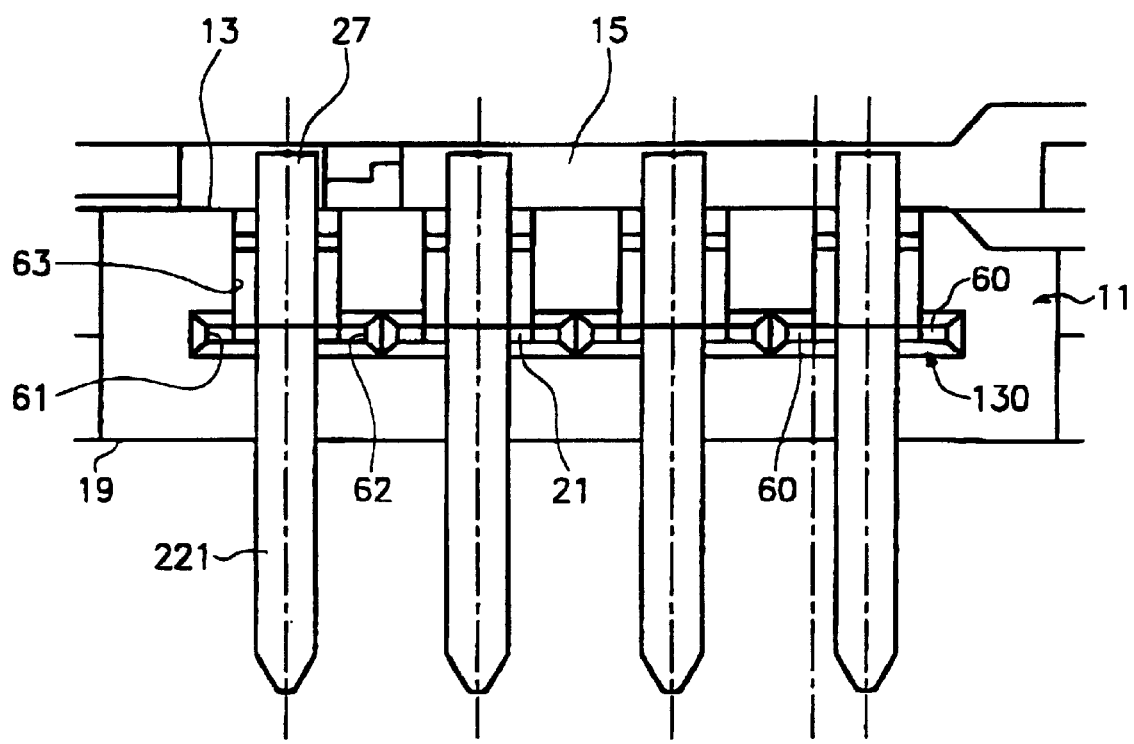
FIG. 4 is a partial view of the smart-card reader of FIG. 3 in the direction of arrow A.

Referring now in particular to FIGS. 2 through 4 the design of the contact support 11 will be discussed. The contact support 11 which has the form of a frame comprises as is shown in FIG. 2 a plurality of contact element chambers or slots 30 one of which is shown in FIG. 3 in a sectional view. Contact elements 21 are inserted into said chambers 30 in a direction parallel to the card support surface 13 in the direction of the arrow A in FIG. 3. After insertion of the contact elements 22 into said chambers 30 they are locked in said inserted position by detent means, i.e., the snap tongue 26.

FIG. 4 is a view in the direction of the arrow A in FIG. 3 onto four such chambers 30.

Figure 8:
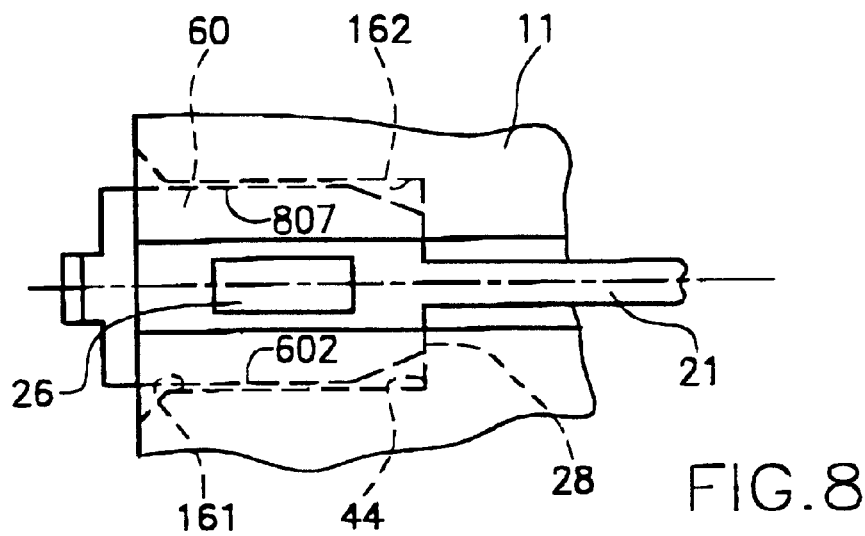
FIG. 8 is an enlarged partial plan view in the direction of arrow B in FIG. 7.
Figure 9:
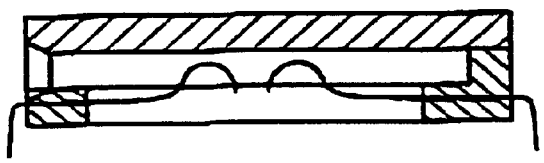
FIG. 9 is a sectional view of a smart-card reader of the prior art.
Figure 10:
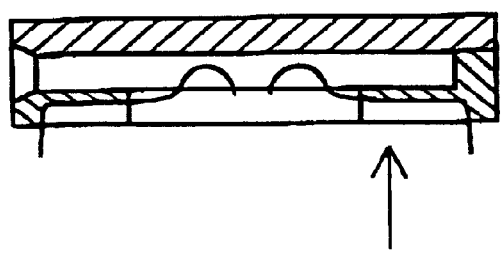
FIG. 10 is another cross-sectional view of another smart-card reader of the prior art, with the arrow showing the direction in which the contact elements are inserted when mounted in the reader.

In accordance with FIGS. 2 and 3 each chamber 30 comprises a termination area 31, a fastening area 32, an opening area 33 comprising an opening 20, and an abutment area 34. In the fastening area 32 (se e FIG. 3) the contact element support 11 comprises two rib portion 40, 41 which define an opening 42. The opening 42 forms an abutment member or abutment surface 43 behind which the snap-in tongue can snap-in as shown in FIG. 3. When the snap-in tongue is in its snap-in or snap-locked position the abutment surface 260 (FIG. 5) of the snap-in tongue 26 is in engagement with the abutment surface 43. This snap-in engagement occurs when the abutment surfaces 28, 29 (FIG. 6) of the mounting or fastening section 23 abut against respective abutment surfaces 44 (FIG. 2) of the contact support 11. Said abutment surfaces 44 are formed preferably by the rib or rod portion 41 of the contact element support 11; see FIG. 8.

Figure 7:
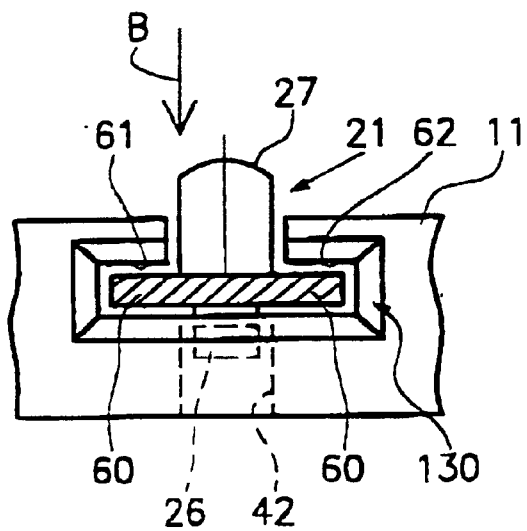
FIG. 7 is an enlarged schematic view of a detail of the contact element in the area of insertion into the contact support.

FIGS. 4 and 7 show the contact element support 11 seen from the direction of arrow A in FIG. 3. It is noted that the contact element support 11 forms an insert incline 130 which simplifies the insertion of the contact elements 21 in the direction of A into the chamber 30. FIGS. 4 and 7 disclose in particular that widening sections 60 of the fastening section 23 extend into slots 61, 62 which are formed on both sides of the chamber and thus form a guide means for the contact element 21 when it is inserted. Also support of the contact element 21 is provided thereby after the contact element 21 is in its snap-in position. Moreover, this design avoids a rotation of the contact elements 21 beyond an admissible range. In FIG. 4 reference numeral 63 refers to one of the walls of the chamber 30.

FIG. 7 discloses the opening 42 together with the snap-in tongue 26 which is in its snap-in position in said opening 42. Each of said widening sections 60 comprises (see FIG. 8) guide edges 602, 807 which extend parallel to each other. Said guide edges 602, 807 together with the side walls 161, 162 (FIG. 8) of the slots 61, 62 assist in holding the contact elements 21 in the inserted position, also called operative position.

INDUSTRIAL APPLICABILITY

For manufacturing a smart card reader, i.e. a smart card contacting apparatus 10 the following steps are taken. Contact elements, preferably contact springs 21 are provided and inserted into said chambers 30 in a directions parallel to the card abutment surface 30. During insertion the smart card 9 is guided until it reaches its inserted or reading position where the card contacts are in contact engagement with the cusps 27 of the contact elements 21. The contact elements 21 are locked in said inserted position.

For this purpose the contact element support 11 is provided with first locking means, i.e. abutment 43 and the contact elements 21 are provided second locking means, i.e. tongue 26. Said first and second locking means come into a locking engagement when the contact elements reach their end position.

Due to the fact, that the contact elements 21 are pushed into said contact support 12 i.e. the chambers 13 thereof from the lateral side(s) of said contact element support 12, the contact elements 21 are securely fastened within said contact element support 12 even if the termination section 22 of the contact element 21 is bent downwardly preferably by 90° with respect to the fastening section 23.

What is claimed is:

1. In combination, a contact element and a contact element support for a smart card reader; the contact element support comprising:
    a card support surface;
    a plurality of chambers formed in said contact element support in the area of said card support surface;
    the contact element comprising a snap-in tongue to cooperate with said contact element support in an inserted operative position;
    the contact element support including a snap-in opening such that shortly before reaching the inserted operative position the snap-in tongue snaps into the snap-in opening of the contact element support so that the contact element is fixedly held in its inserted operative position, and
    wherein the contact elements are insertable into said chambers in a direction parallel to the card support surface;
    wherein said contact clement comprises widened portions adapted to be inserted into slots of said contact element support; and
    wherein said slots are aligned with the direction parallel to the card support surface and are open at one end and closed at an opposite end by a second abutment surface that abuts the contact element when the contact element is in the inserted operative position.

2. The combination of claim 1, comprising plastic material.

3. The combination of claim 1, wherein said contact element is a contact spring.

4. The combination of claim 1, wherein said contact element support includes a first abutment surface and a second abutment surface spaced from said first abutment surface, and the first abutment surface abuts a snap-in tongue abutment surface when the contact element is in the inserted operative position.

5. The combination of claim 4, wherein said second abutment surface abuts the contact element when the contact element is in the inserted operative position, whereby the contact element is held between the first abutment surface and the second abutment surface.

* * * * *

UNITED STATES PATENT AND TRADEMARK OFFICE
CERTIFICATE OF CORRECTION

PATENT NO.     : 6,283,376 B1
DATED          : September 4, 2001
INVENTOR(S)    : Bernd Schuder et al.

It is certified that error appears in the above-identified patent and that said Letters Patent is hereby corrected as shown below:

Column 3,
Line 67, change "a" to -- α --.

Column 4,
Line 41, change "se e" to -- see --.

Signed and Sealed this

Twenty-ninth Day of June, 2004

JON W. DUDAS
*Acting Director of the United States Patent and Trademark Office*